United States Patent
Yamazaki

(10) Patent No.: US 8,542,560 B2
(45) Date of Patent: Sep. 24, 2013

(54) DIFFRACTION GRATING AND OPTICAL PICKUP DEVICE

(75) Inventor: Kazuyoshi Yamazaki, Kawasaki (JP)

(73) Assignee: Hitachi Media Electronics Co., Ltd., Tokyo (JP)

( * ) Notice: Subject to any disclaimer, the term of this patent is extended or adjusted under 35 U.S.C. 154(b) by 851 days.

(21) Appl. No.: 11/506,307

(22) Filed: Aug. 17, 2006

(65) Prior Publication Data

US 2007/0206479 A1 Sep. 6, 2007

(30) Foreign Application Priority Data

Mar. 3, 2006 (JP) ................................. 2006-057091

(51) Int. Cl.
*G11B 7/00* (2006.01)
(52) U.S. Cl.
USPC ................ 369/44.37; 369/44.24; 369/110.03; 369/112.05; 369/112.06; 369/112.07
(58) Field of Classification Search
None
See application file for complete search history.

(56) References Cited

U.S. PATENT DOCUMENTS

| | | | | |
|---|---|---|---|---|
| 5,684,779 A | * | 11/1997 | Ohuchida et al. | 369/112.12 |
| 5,835,471 A | * | 11/1998 | Miyamoto et al. | 369/112.07 |
| 2003/0012092 A1 | * | 1/2003 | Katayama | 369/44.23 |
| 2003/0016448 A1 | | 1/2003 | Takasuka et al. | |
| 2005/0088950 A1 | | 4/2005 | Tanimoto | |
| 2006/0193219 A1 | * | 8/2006 | Kawamura et al. | 369/44.37 |
| 2007/0206479 A1 | * | 9/2007 | Yamazaki | 369/112.05 |

FOREIGN PATENT DOCUMENTS

| | | |
|---|---|---|
| JP | 2001-014717 A | 1/2001 |
| JP | 2005-122869 | 5/2005 |
| JP | 2005-122869 A | 5/2005 |

OTHER PUBLICATIONS

Japan Patent Office (JPO) office action for JPO patent application JP2006-057091 (Jun. 15, 2010).

* cited by examiner

*Primary Examiner* — Joseph Feild
*Assistant Examiner* — Ifedayo Iluyomade
(74) *Attorney, Agent, or Firm* — Kilpatrick Townsend & Stockton LLP

(57) ABSTRACT

Disclosed are a module to detect a tracking error signal that is easy to be assembled and robust against variation in a track angle, a diffraction grating, an optical pickup, and an optical disc apparatus that enable the module to be realized, wherein a diffraction grating divided into at least three areas, first, second, and third areas, is used; the second area is an area that do not diffract light; and focusing positions of light diffracted by the first and third areas sandwiching the second area therebetween on an optical disc are arranged with a spacing of $(2n-1) \times t/2$ in an optical disc radial direction, respectively, where n is a nonnegative integer and t is a spacing of guide grooves of the optical disc.

5 Claims, 18 Drawing Sheets

(1)

On the disk (sub)

On the objective lens (sub)

On the detector plane (sub)

(2)

On the disk (sub)

On the objective lens (sub)

On the detector plane (sub)

(1) On the disk (sub)

(2) On the disk (sub)

On the objective lens (sub)

On the objective lens (sub)

On the detector plane (sub)

On the detector plane (sub)

DIFFRACTION GRATING AND OPTICAL PICKUP DEVICE

BACKGROUND

This invention relates to a diffraction grating, an optical pickup device, and an optical disc apparatus.

As a background art of this technical field, Japanese Patent Laid-open Application (JP-A) No. 2005-122869 describes, in Problem to be Solved by the Invention, that influences by eccentricity of a disc-shaped recording medium etc. are reduced, so that the quality of a tracking error signal is intended to be improved, and also describes, in Means for Solving the Problem that an optical pickup device, as solving means, is provided with a diffraction grating 10 that makes possible recording or reproduction of an information signal for two or more kinds of disc-shaped recording media 100 used for respective different working wavelengths and has plural areas each of which divides each of laser lights of different wavelengths emitted from emitting elements 9 into a main optical beam, a pair of first sub optical beams, and a pair of second sub optical beams; moreover, a distance D between spot centers of the first sub optical beams and spot centers of the second sub optical beams formed separately on a recording surface of any one of the two or more kinds of disc-shaped recording media is made substantially equal to $(2n-1)\times P/2$, where n denotes a nonnegative integer and P denotes a track pitch of any one of the two or more kinds of disc-shaped recording media.

As another background art of this technical field, there is an article of the Nikkei Electronics, p. 47, Oct. 25, 2004.

SUMMARY

Generally, an optical pickup device, in order to irradiate its spot on a predetermined recording track in an optical disc properly, adjusts its objective lens in a focusing direction by displacing the objective lens in the focusing direction by detection of a focus error signal. And the optical pickup device performs tracking adjustment by displacing the objective lens in the optical disc-shaped recording medium by detection of, art tracking error signal. These signals serve to enable a position control of an objective lens.

Among several methods of the optical pickup device, there is known the push-pull method, which has, however, a problem that a large direct current variation (hereinafter referred to as a DC offset) is likely to occur due to displacement of the objective lens in a tracking direction.

In order to solve this problem, the differential push-pull method whereby this DC offset can be reduced is widely being used.

The differential push-pull system (DPP: Differential Push Pull system) divides a optical beam into a main optical beam and sub optical beams with a diffraction grating, and reduces the DC offset by using a spot of the main optical beam (hereinafter referred to as a main spot) and spots of the sub optical beams (hereinafter referred to as sub spots) all located on the optical disc.

However, since in the DPP method, three spots must be arranged to the track as determined beforehand, if any disturbance, for example, eccentricity of the optical disc and rotation deviation of the diffraction grating, occurs, amplitude variation of the DPP signal is generated, which makes it difficult to perform a stable tracking control.

To cope with this problem, the JP-A No. 2005-122869 proposes the following method wherein: a diffraction grating having plural areas each of which divides laser light emitted from a light emitting element into a main optical beam, a pair of first sub optical beams, and a pair of second sub optical beams is provided; and a distance D between spot centers of the first sub optical beams and spot centers of the second sub optical beams that are formed separately substantially in a radial direction of the disc-shaped recording medium on a recording surface of the disc-shaped recording medium is made substantially equal to $(2n-1)\times P/2$, where n denotes a nonnegative integer and P denotes a track pitch of the disc-shaped recording medium. By this setting, influences by the eccentricity of the disc and rotation variation of the diffraction grating can be reduced. As this system divides a optical beam into five beams with the diffraction grating, this tracking error detection method will be referred to as a conventional 5-beam DPP method in order to simplify explanation below.

With this technique, even if an objective lens will scan positions off a straight line that passes through the center of the optical disc and elongates in a radial direction, the system will be able to acquire the tracking error signal. Therefore, this technique makes it possible to arrange two objective lenses, side by side, in an optical disc tangential direction as shown on the Nikkei Electronics, p. 47, Oct. 25, 2004.

However, the conventional 5-beam DPP method has such a problem as will be described below. According to the JP-A No. 2005-122869, a push-pull signal amplitude of the subsidiary (hereinafter called as sub) beam becomes zero in the conventional 5-beam DPP method, and only the DC offset generated when the objective lens displaces in the tracking direction is detected. Accordingly, the system manages to cancel the DC offset signal of the main beam, by using this. However, if the amount of off center is enlarged, the push-pull signal amplitude of the sub optical beam will be detected, and the tracking error signal will vary largely with an inner/outer periphery position of the optical disc. It turned out, for this reason, that in order to acquire a practicable tracking error signal using the system of the JP-A No. 2005-122869, the amount of off center must be limited to be in a very narrow range. Moreover, since the tracking error signal will vary depending on the inner/outer peripheral position of the optical disc even if an off-center amount is made small by some degree, this variation impedes practical performance of the optical pickup device, which is a problem to be solved.

For example, in the case of an optical pickup as shown in the Nikkei Electronics, p. 47, Oct. 25, 2004, it becomes mandatory for one actuator to be equipped with two objective lenses. For this reason, there is a problem that it is hard to perform full capabilities of an actuator. In order to support a higher speed of recording and reconstruction using the two objective lenses, it is desirable to install two actuators separately, and in this case, the amount of off center needs to be enlarged.

No well-known documents refer to the above-mentioned problem, i.e., a problem that the tracking error signal of the conventional 5-beam DPP method depends on the amount of off center, and naturally no means for solving it is disclosed at all under present circumstances.

In view of this problem, the object of the present invention is to advantageously reduce the dependency of the tracking error signal on the amount of off center that is the problem in the conventional 5-beam DPP method. Specifically, the object is to provide an optical pickup device using new tracking error detecting means capable of detecting a practicable tracking error signal from which the DC offset signal is removed excellently even for a large amount of off center, an optical information reproduction apparatus, an optical information recording and reproduction apparatus, and a diffraction grating used there for.

this invention has as an object to improve performance of the diffraction grating, an optical pickup device, and an optical disc apparatus.

The object can be attained by the invention as described in the "What is claimed is."

According to this invention, the performance of a diffraction grating, an optical pickup device, and an optical disc apparatus can be improved.

BRIEF DESCRIPTION OF THE DRAWINGS

These and other features, objects and advantages of this invention will become more apparent from the following description when taken in conjunction with the accompanying figures wherein.

DETAILED DESCRIPTION-OF THE PREFERRED EMBODIMENTS

First Embodiment

Figure 1:
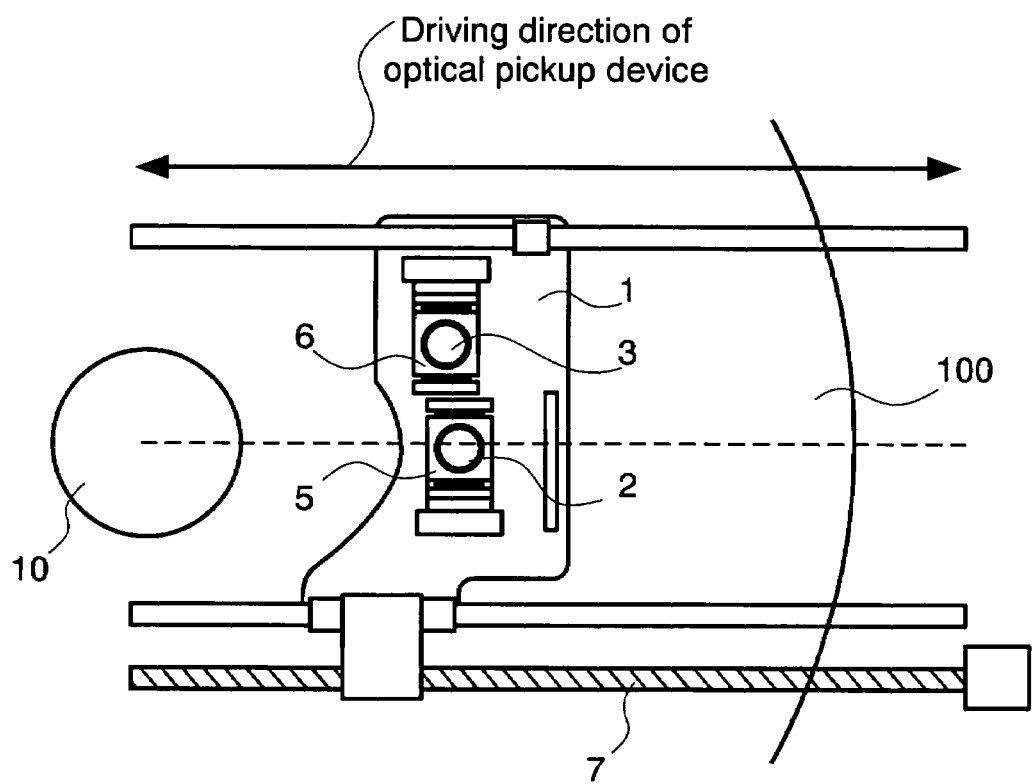
FIG. 1 is a diagram showing placement of an optical pickup device and an optical disc in a first embodiment.

FIG. 1 is an outline configuration diagram showing one example of an optical pickup device in a first embodiment according to this invention.

An optical pickup device 1 is constructed to be able to be driven in a radial direction of the optical disc 100 by a drive mechanism 7, as shown in FIG. 1, and carries an actuator 5 and its objective lens 2, and an actuator 6 and its objective lens 3 thereon. The objective lens 3 is so disposed that its lens center is on an axis that passes through the center of the optical disc 100 and elongates in a driving direction of the optical pickup device, i.e., a radial direction. Moreover, the objective lens 3 is so disposed that a lens center thereof is in a substantially perpendicular direction to the driving direction of the optical pickup device, i.e., a radial direction.

Figure 2:
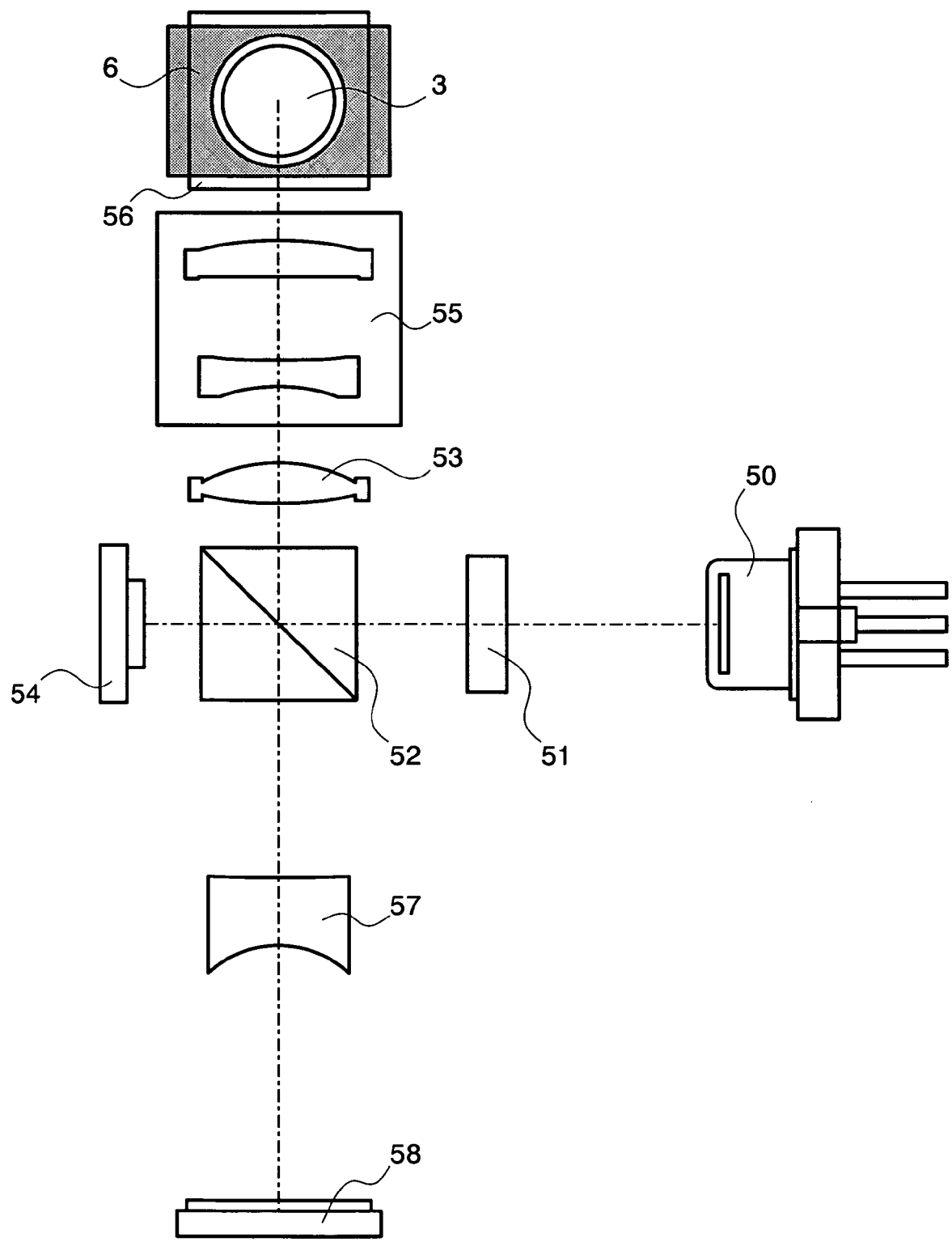
FIG. 2 is a diagram explaining the optical pickup device in the first embodiment.

In the optical pickup device, FIG. 2 shows part of the optical system for shifting a optical beam off center. Here, explanation will be given with an optical system of BD. Although the part of the optical system for shifting a optical beam off center was shown as in FIG. 2 for the sake of simplification, the part of the optical system for shifting a optical beam off center may share a common optical path, which causes no problem at all.

A semiconductor laser 50 emits a optical beam of a wavelength of substantially 405 nm as divergent light. The optical beam emitted from the semiconductor laser 50 is divided into five optical beams with a diffraction grating 51 shown in FIG. 3. The optical beam being passed through the diffraction grating 51 is reflected by a beam splitter 52 and converted into a substantially collimated optical beam by a collimator lens 53. Part of the optical beam is passed through the beam splitter 52 and enters a front monitor 54. Generally in the case where information is recorded in an optical disc of a recording type, such as BD-RE, it is necessary to control the quantity of light from a semiconductor laser precisely in order that a predetermined quantity of light is irradiated on a recording surface of the optical disc. For this reason, when recording a signal in the optical disc 100 of a recording type, the front monitor 54 detects a variation in the quantity of light from the semiconductor laser 50, which is fed back to a drive circuit (not shown) of the semiconductor laser 50. This procedure makes possible monitoring of the quantity of light on the optical disc 100.

The optical beam emitted from the collimator lens 53 enters a beam expander 55. The beam expander 55 is used to compensate spherical aberration due to a thickness error of a cover layer of the optical disc 100 by changing a divergence/convergence state of the optical beam.

The optical beam emitted from the beam expander 55 is reflected by a reflection mirror 56, and focused on the optical disc 100 by the objective lens 3 for BD mounted on the actuator 6. Five spots are formed on the optical disc 100.

The optical beam reflected by the optical disc 100 enters an optical detector 58 through the objective lens 3 for BD, the reflection mirror 56, the beam expander 55, the collimator lens 53, the beam splitter 52, and a detecting lens 57. When the optical beam is passed through the detecting lens 57, the optical beam is given predetermined astigmatism, and used for detection of a focus error signal.

Figure 4:
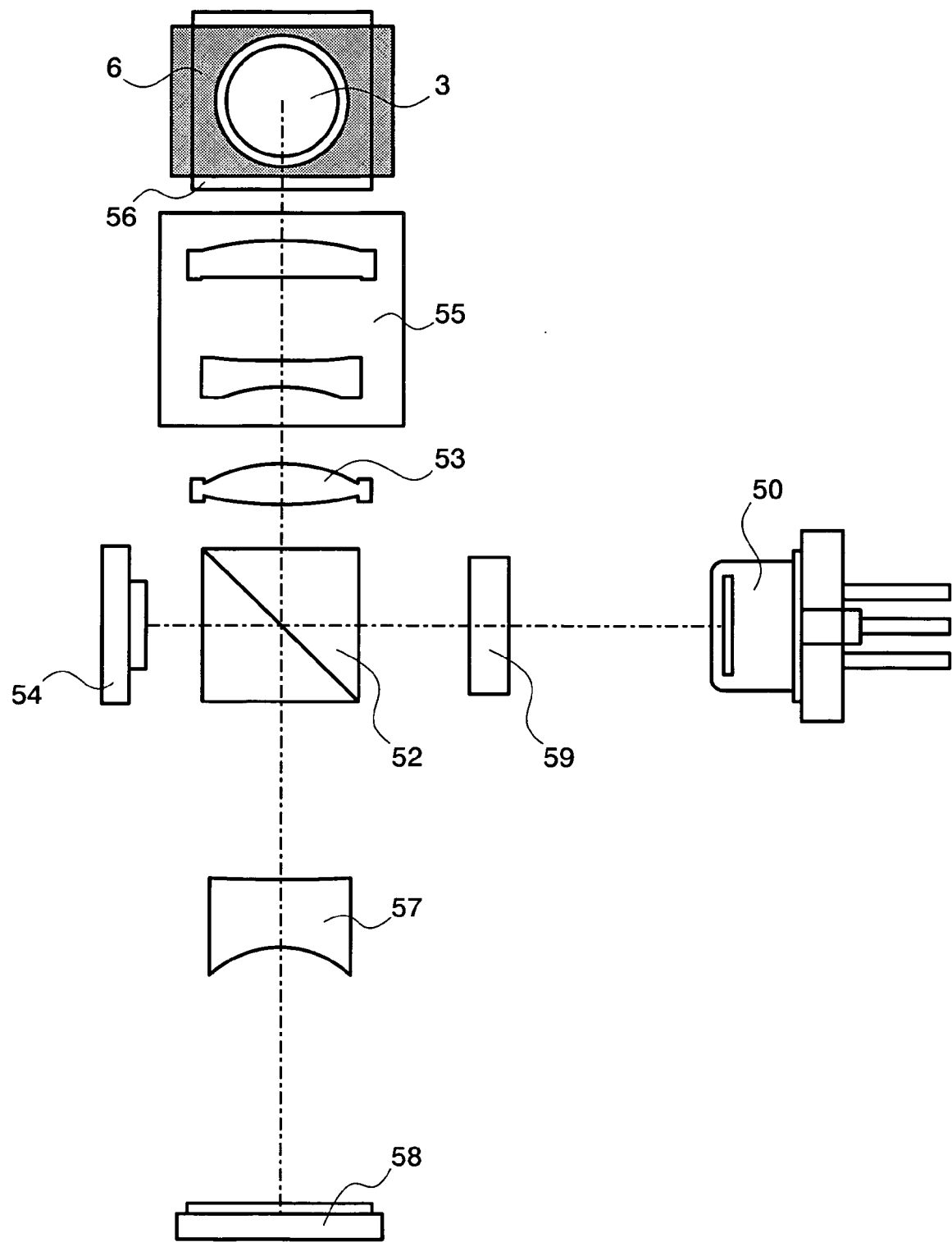
FIG. 4 is a diagram explaining an optical pickup device using the conventional 5-beam DPP method in the first embodiment.
Figure 5:
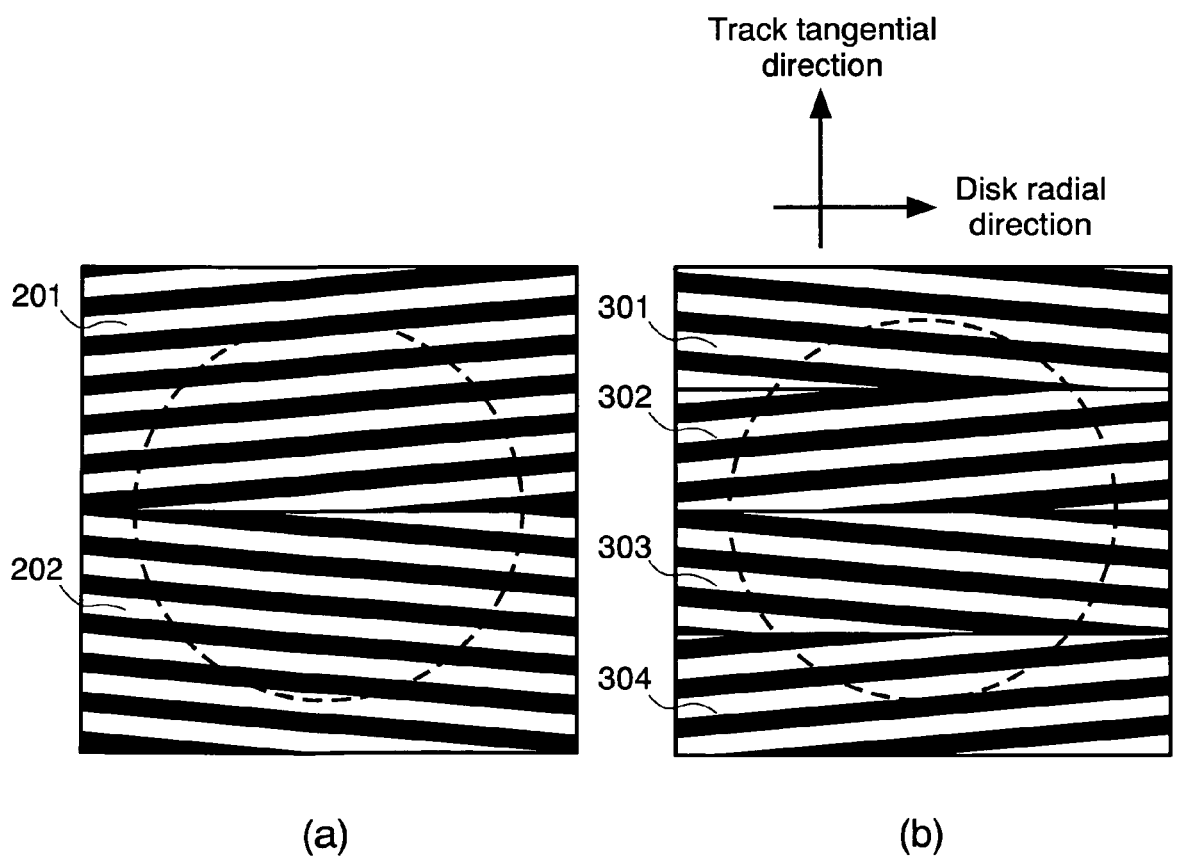
FIG. 5 is a diagram explaining a diffraction grating of the conventional 5-beam DPP method in the first embodiment.

The first embodiment of this invention described above is constructed with almost the same configuration of an optical system and the same focus spot arrangement as those of the optical pickup device that uses the conventional 5-beam DPP method shown in FIG. 4, but differs in a grating pattern of the diffraction grating 51 provided between the semiconductor laser 50 and the beam splitter 52. On the other hand, FIGS. 5A and 5B are diffraction grating 59 patterns of the conventional 5-beam DPP method.

Next, described below will be a reason why the use of this embodiment advantageously reduce the dependency of a tracking error signal on the amount of off center compared with the conventional 5-beam DPP method, even when the tracking error signal is detected by the entirely same means as that of the conventional 5-beam DPP method.

Figure 6:
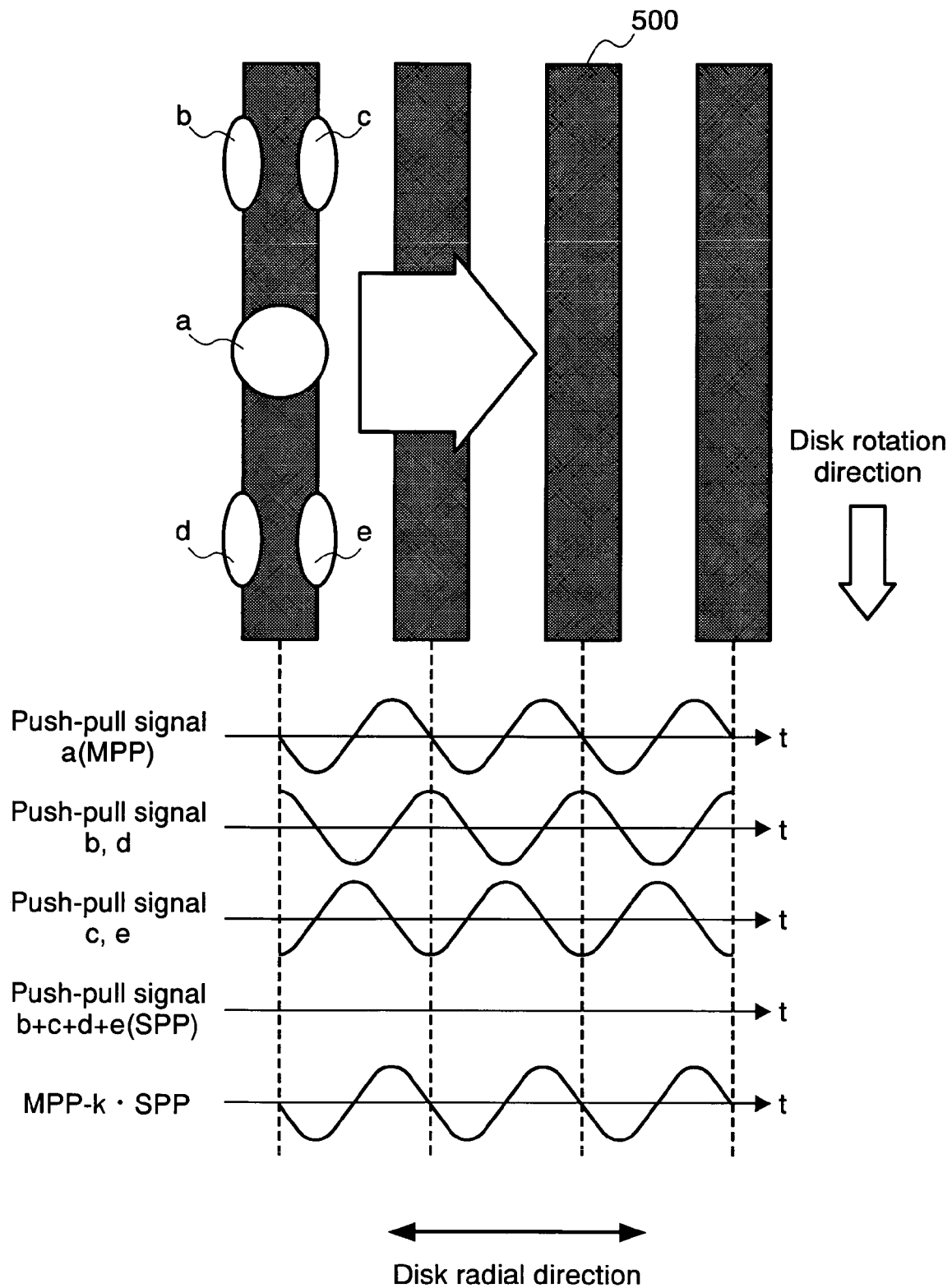
FIG. 6 is a diagram explaining a principle of the 5-beam DPP method in the first embodiment.

First, a signal detection principle of the 5-beam DPP method will be explained briefly. FIG. 6 shows positions of a main spot a, sub spot +1st light b, c, and sub spot −1st light d, e of optical beams that were divided by a diffraction grating 51 (or 59) on the optical disc 100, and push-pull signals a, b, c, d, and e detected from respective spots.

Figure 3:
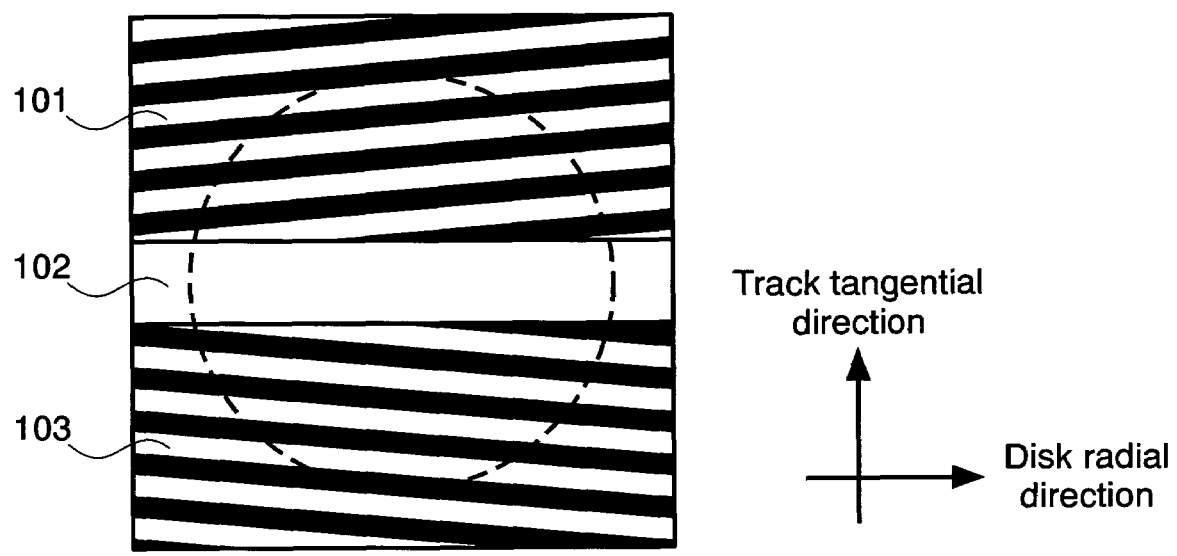
FIG. 3 is a diagram explaining a diffraction grating in the first embodiment.

By an action of the diffraction grating 51, the optical beams diffracted by a first area 101 and by a third area 103 shown in FIG. 3 form the sub spots b, e and the sub spots c, don the optical disc 100 of FIG. 6, respectively. In addition, with the diffraction grating 59 of the conventional 5-beam DPP method shown in FIG. 5, the optical beam diffracted by an area 201 (302, 304) and the optical beam diffracted by an area 202 (301, 303) form the sub spots b, e and the sub spots c, d on the optical disc 100 of FIG. 6, respectively.

Here, assume that the light spots a-e of FIG. 6 move to an optical disc radial direction (right hand side in the figure).

When the main spot a shifts to the optical disc radial direction from a position in the figure, a push-pull signal a, as shown in the bottom of FIG. 6, can be detected along the track of the optical disc 100. Moreover, push-pull signals b, d are detectable from the sub spots b, d. Furthermore, push-pull signals c, e whose phase are mutually reversed by substantially 180° to the push-pull signals b, d can be detected from the sub spots c, e. Here, designating the push-pull signal a by MPP and designating a signal that is a sum total of all the push-pull signals b, c, d, and e by a SPP signal, the tracking error signal (TES) can be obtained by the following operation.

$$TES = MPP - k \cdot SPP \quad [\text{Formula 1}]$$

Symbol k in the formula is a coefficient for correcting a difference of the quantity of light between the main spot and the sub spot. FIG. 6 clearly shows that summation of all the push-pull signals b, c, d, and e makes zero, and therefore an operation of Formula 1 equalizes the tracking error signal and the MPP signal. Since this operation does the same operation as the DPP signal operation, it can cancel the offset at the time of objective lens shift, which is an advantage.

Figure 7:
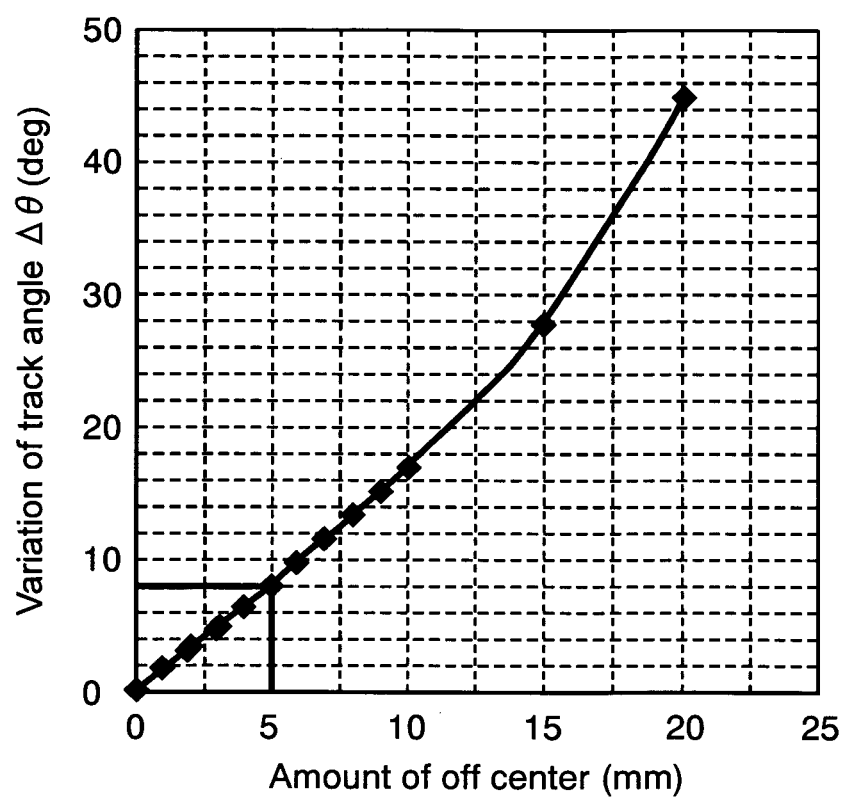
FIG. 7 is a diagram showing variation of track angle as a function of the amount of off center in the embodiment 1.

A reason why the tracking error signal of the conventional 5-beam DPP method depends on the amount of off center will be explained briefly. If off-centering occurs, the gradient of a track will be dependent on an optical disc radial position. FIG. 7 is a graph showing the variation of track angle (a difference between the track angle in the outer peripheral position (radial position 57.5 mm) and the track angle in the inner peripheral position (radial position 22 mm) of the optical disc) as a function of the amount of off center. For example, the graph shows that, if the amount of off center is set to 5 mm, the track angle varies by about 8° between the inner periphery and the outer periphery of the optical disc. Thus, by increasing the amount of off center, the variation of track angle is increased.

Figure 8:
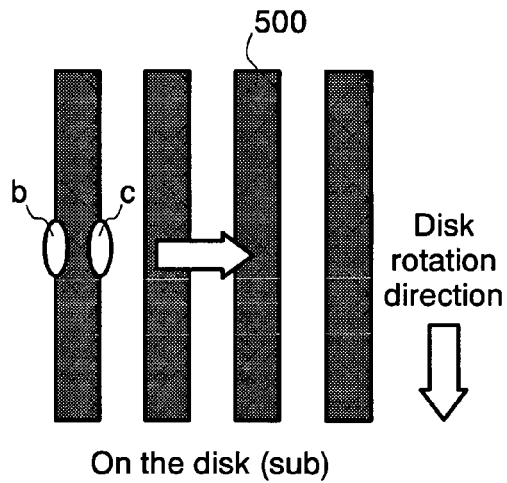
FIG. 8 is a diagram explaining that the conventional 5-beam DPP method in the first embodiment depends on a track angle.
Figure 8:
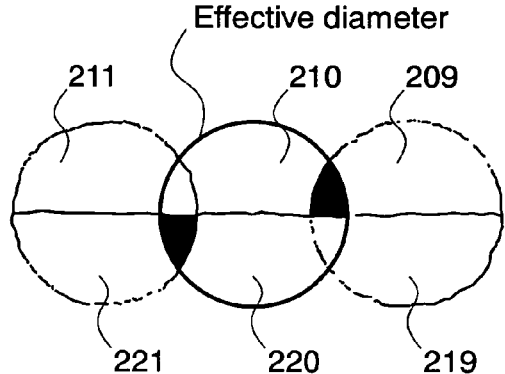
Figure 8:
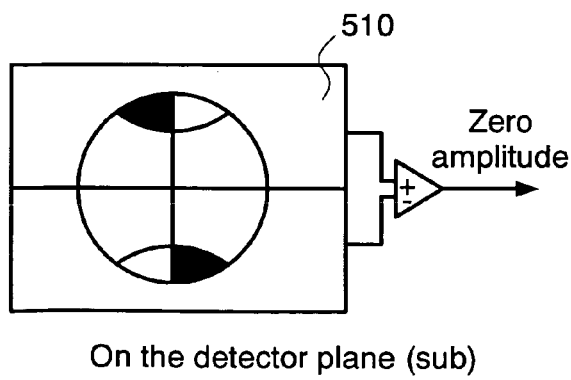
Figure 8:
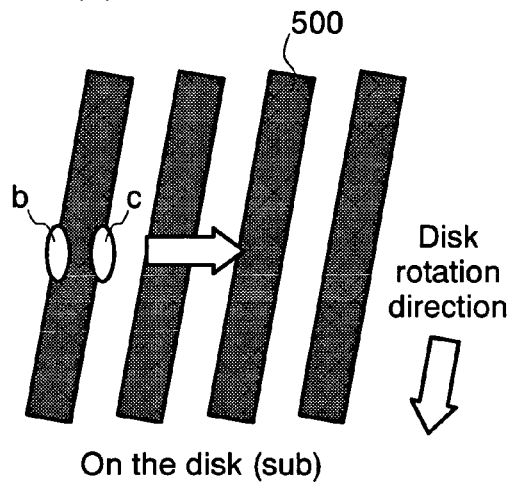
Figure 8:
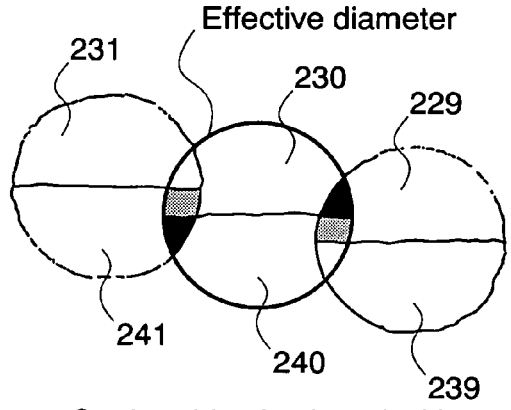
Figure 8:
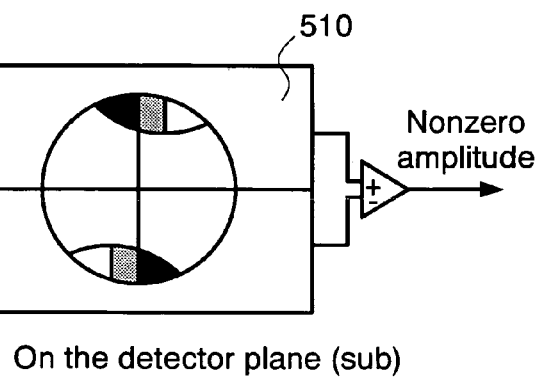

First, the tracking error signal in the case where the diffraction grating 59 of the conventional 5-beam DPP method is used will be explained. FIGS. 8-1 and 8-2 schematically show sub +1st light on the objective lens and on the detection plane when the diffraction grating of FIG. 5A is used. FIG. 8-1 shows the case where a division line of the areas of the diffraction grating 59 is disposed perpendicularly to the track; FIG. 8-2 shows the case where the division line is disposed inclined from the perpendicular direction by some degrees. That is, FIG. 8-2 schematically shows the sub +1st light when the optical beam is shifted off center.

A push-pull signal is formed by detecting interference of the disc +1st order light diffracted by the tracks on the optical disc 100 and the disc zero-order light (in order that they are not confused with diffracted light of the diffraction grating, the following notation is adopted: The +1st light of the optical beam diffracted by the disc, the −1st light, and the zero-order light are called the disc +1st light the disc −1st light, and the disc zero-order light, respectively). Here, since the push-pull signal formation principle is already well-known, explanation will be omitted. Note that, since the embodiment shows an example where the astigmatic system is adopted as a focus detection system, an intensity distribution of the spot on the light receiving plane of the optical detector is rotated by substantially 90° about the optical axis. Due to this geometry, the optical pickup device is configured to detect a push-pull signal from a difference between output signals from the light receiving plane divided into two areas in a direction corresponding to a tangential direction of the optical disc, as shown in the figure.

First, assume that the division line of the areas of the diffraction grating 59 is perpendicular to the track, as in FIG. 8-1. Since the disc diffracted light is diffracted perpendicularly to the track, the diffracted light to the sub spot b becomes +1st light 211 and −1st light 209, as in the figure. Here, a push-pull signal b produced by interference of the disc ±1st order light 211, 209 and zero-order light 210 to the sub spot b is detected. Moreover, a push-pull signal c produced by interference of ±1st order light 221, 219 and zero-order light 220 to the sub spot c is also detected. As described above, since the push-pull signal b and the push-pull signal c have mutually reversed phases, the amplitude of a summed signal becomes zero. Since it is considered that the situation is the same also in the sub spots d, e, the tracking error signal becomes equal to the MPP signal after all.

Next, assume that the division line of the areas of the diffraction grating 59 makes 90° plus a certain angle to the track, as in FIG. 8-2. Considering similarly, since the disc diffracted light is diffracted perpendicularly to the track, diffracted light to the sub spot b becomes disc +1st light 231 and disc −1st light 229, as in the figure. Moreover, diffracted light to the sub spot c becomes disc +1st light 241 and disc +1st light 239, as in the figure. Here, since the push-pull signal by interference of the disc ±1st order light 231, 229 and zero-order light 230 to the sub spot b and the push-pull signal by interference of the disc ±1st order light 241, 239 and zero-order light 240 to the sub spot c are reversed in phase, the amplitude of the summed signal becomes zero. However, at the same time, there occurs interference of the zero-order light 230 to the sub spot b and the +1st light 241 to the sub spot c, and interference of the zero-order light 240 to the sub spot c and the −1st light 229 to the sub spot b. In this area, even if doing a push-pull operation, the signal does not cancel. As a result, the signal will influence the tracking error signal. This is a problem to be solved in the conventional 5-beam DPP method. Incidentally, since this situation is the same when the diffraction grating of FIG. 5B is also used, explanation will be omitted.

Figure 9:
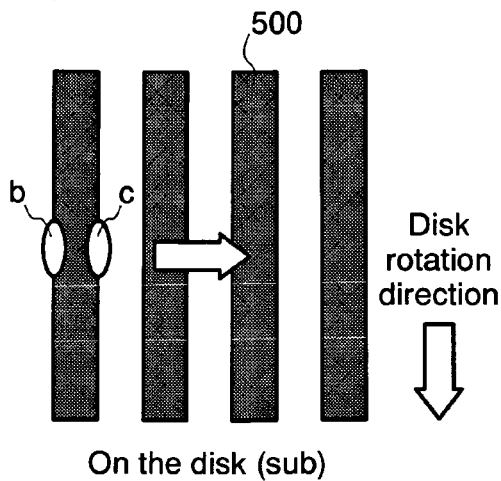
FIG. 9 is a diagram explaining that this invention in the first embodiment does not depend on the track angle.
Figure 9:
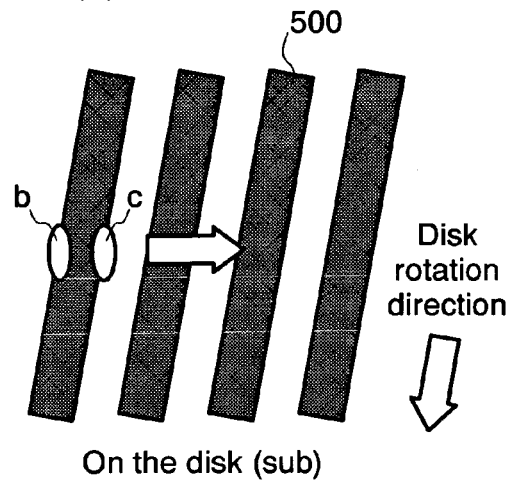
Figure 9:
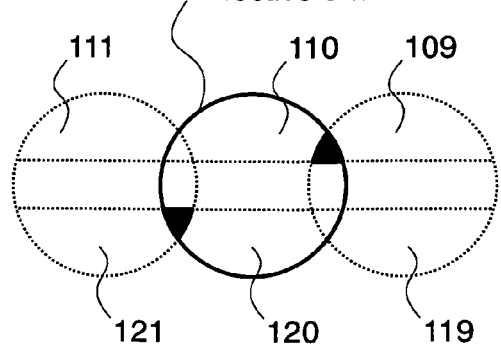
Figure 9:
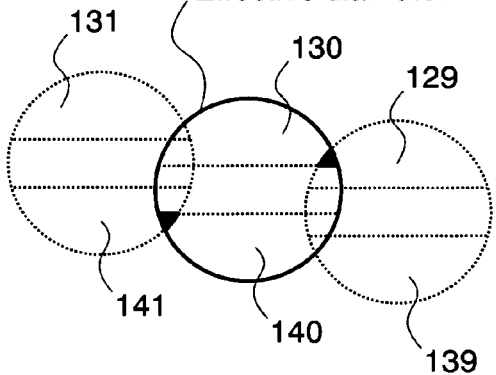
Figure 9:
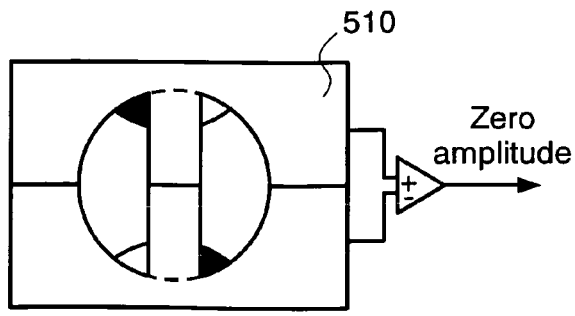
Figure 9:
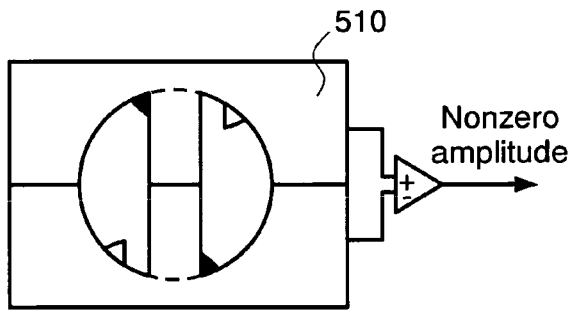

Next, track angle dependency in the case where the diffraction grating 51 of this invention is used will be explained. FIG. 9 schematically shows the sub +1st light on the objective lens and the detection plane at the time of using a three-section diffraction grating of FIG. 3 of this invention.

First, assume that the division line of areas of the diffraction grating 51 is perpendicular to the track, as in FIG. 9-1. Since the disc diffracted light is diffracted perpendicularly to the track, diffracted light to the sub spot b becomes disc +1st light 111 and disc −1st light 109, as in the figure. Here, a push-pull signal b produced by interference of the ±1st order light 111, 109 and zero-order light 110 to the sub spot b is detected. Moreover, a push-pull signal c produced by interference of ±1st order light 121, 119 and zero-order light 120 to the sub spot c is also detected. As described above, since the phases of the push-pull signal a and the push-pull signal c are reversed to each other, the amplitude of the summed signal becomes zero. Since the situation can be considered similarly in the sub spots d, e, the tracking error signal becomes equal to the MPP signal after all.

Figure 10:
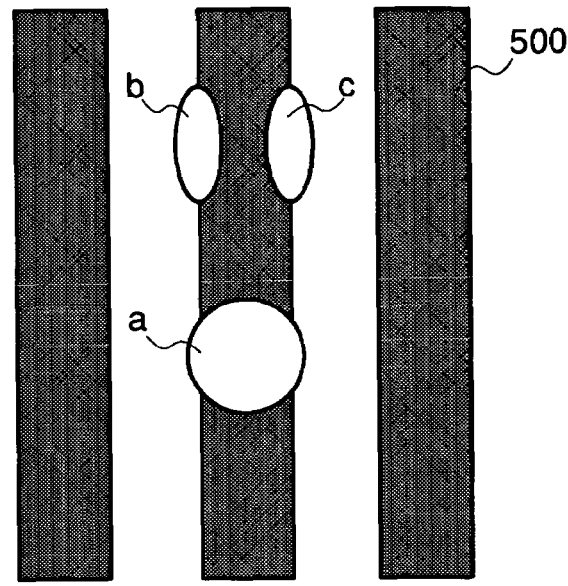
FIG. 10 is a diagram showing a spot arrangement on the disc in the first embodiment.

Next, assume that the division line makes 90° plus a certain angle to the track, as in FIG. 9-2. Considering the situation similarly as in the above, since the disc diffracted light is diffracted perpendicularly to the track, diffracted light to the sub spot b becomes disc +1st light 131 and disc −1st lights. 129; as in the figure. Moreover, the diffracted light to the sub spot c becomes disc +1st light 141 and disc −1st light 139, as in the figure. Here, the following point should be noted: Since a push-pull signal by interference between the disc ±1st order light 131, 129 and zero-order light 130 to the sub spot b is reversed to a push-pull signal produced by interference between the disc ±1st order light 141, 139 and zero-order order light 140 to the sub spot c, an amplitude of a signal obtained by summation of the two signals becomes zero. As is clear from the figure, an interference area that poses a problem is not generated. From this, occurrence of the SPP signal amplitude can be suppressed even when the beam is shifted off center. Further, an offset at the time of shifting of the objective lens can be coped with by altering a coefficient k for correcting a difference of the quantity of light. Further, as shown in FIG. 10, it is needles to say that the same effect can be obtained only by arranging two sub spots in front of or at the rear of the main spot.

Figure 11:
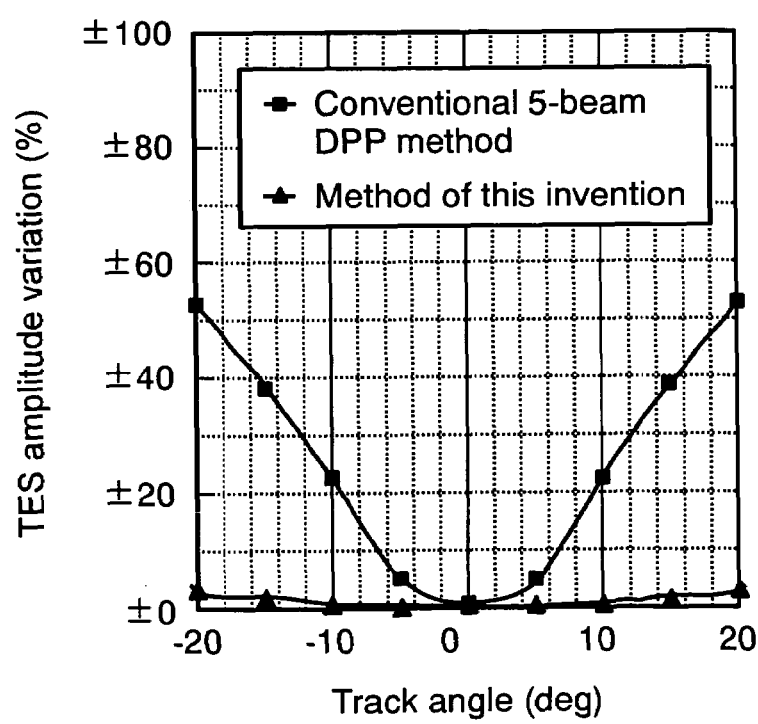
FIG. 11 is a diagram comparing tracking error signal variation as a function of the amount of off center between the present system in the first embodiment and the conventional 5-beam DPP method.

Based on this, effects of this invention will be explained. FIG. 11 shows results of calculation simulation to compare the conventional 5-beam DPP method and this system in terms of the tracking-error-signal amplitude variation as a function of the variation of track angle. Main parameters of the optical pickup device used for the calculation simulation are as follows.

(1) Laser wavelength: 405 nm
(2) Objective lens NA: 0.85
(3) Track pitch: 0.32 μm (BD-RE assumed)

Figure 12:
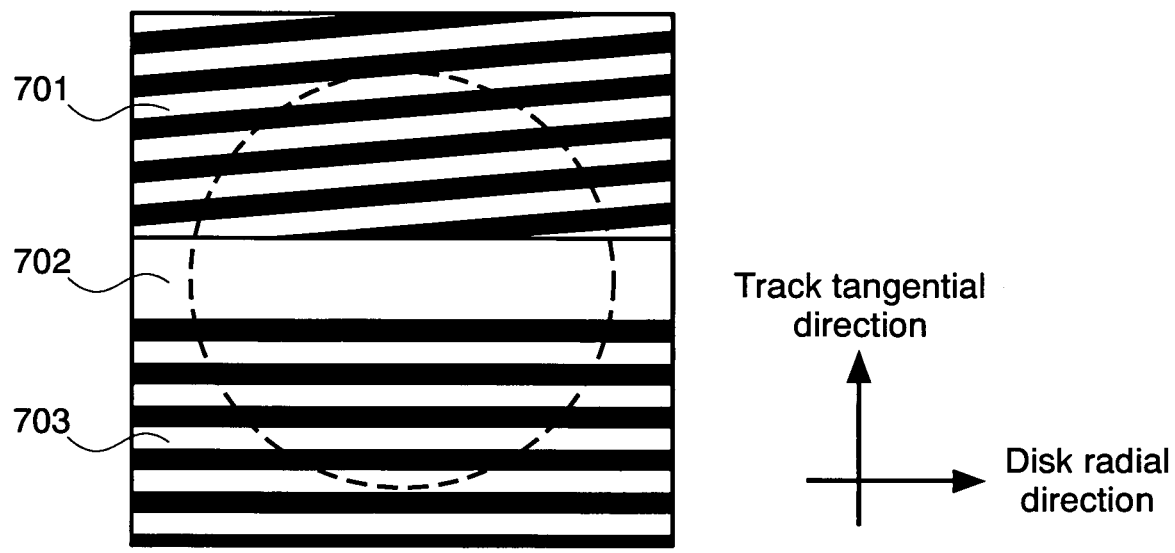
FIG. 12 is a diagram explaining a diffraction grating in the first embodiment.

In the conventional 5-beam DPP method (symbol ■ in FIG. 11) using the grating of FIGS. 5A, 5B, with increasing variation of track angle, the tracking-error-signal amplitude variation becomes large abruptly. In contrast to this, in the present system (symbol ▲ in FIG. 11) using the three-section grating of FIG. 3, it is seen that this phenomenon is suppressed. For this reason, even if variation in the angle of the track becomes large, a practicable tracking error signal from which the DC offset signal is always removed excellently can be detected. With the use of this invention, not only a stable tracking error signal can be detected, but also the amount of off center can be enlarged. Accordingly, the actuators become enable to carry two objective lenses, one objective lens for one actuator, and faster recording/reproduction becomes possible. Although the explanation was given for BD, other recording/reproduction method may be used without any inconvenience. Naturally, even with a diffraction grating as shown in FIG. 12, the system can attain the same effect.

Second Embodiment

Figure 13:
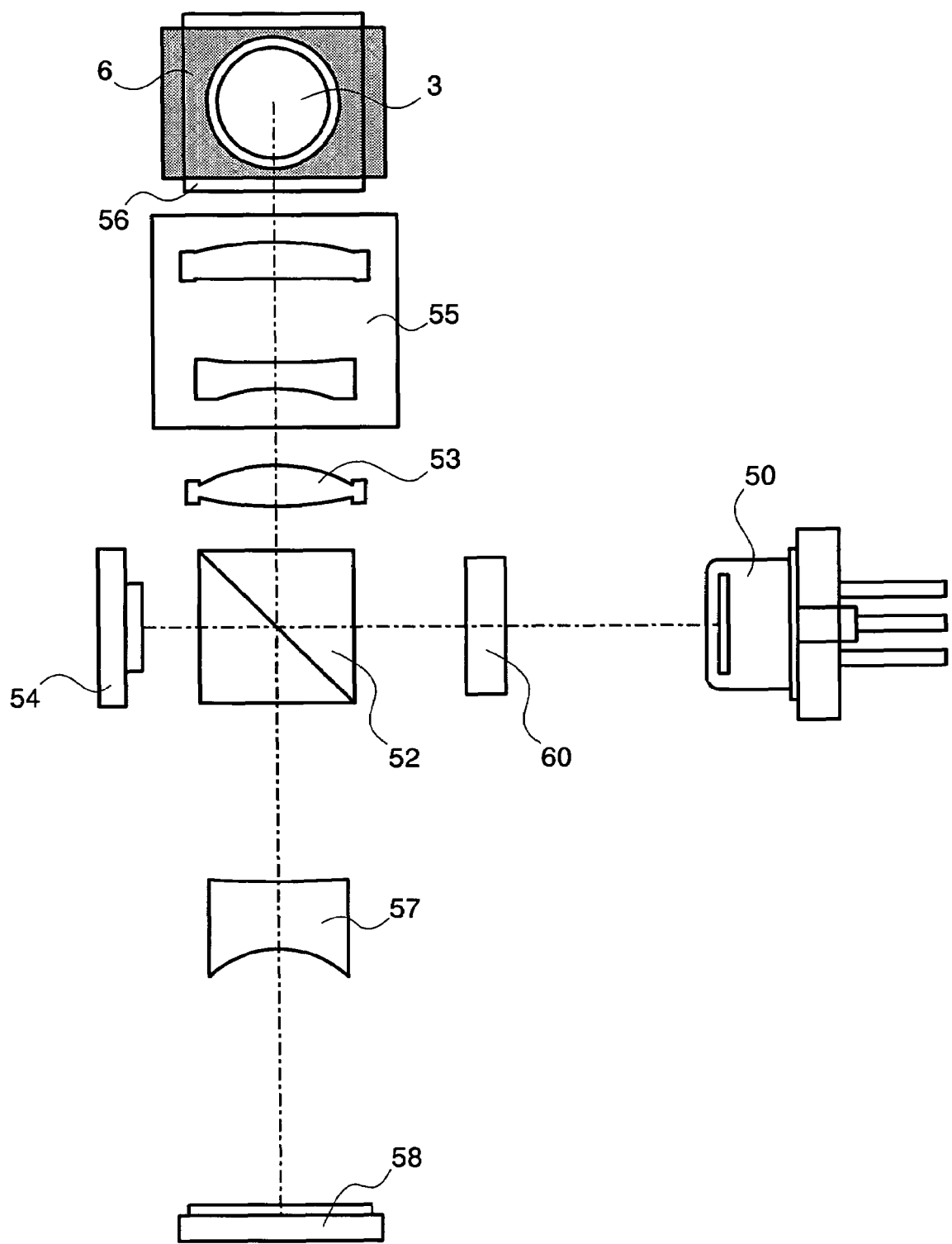
FIG. 13 is a diagram explaining an optical pickup device in a second embodiment.

FIG. 13 shows a schematic diagram of an optical system on the off center side in a second embodiment according to this invention. For optical components shown in the figure, the same optical components as used in the first embodiment of this invention shown in FIG. 2 are designated by the same reference numerals, respectively.

Figure 14:
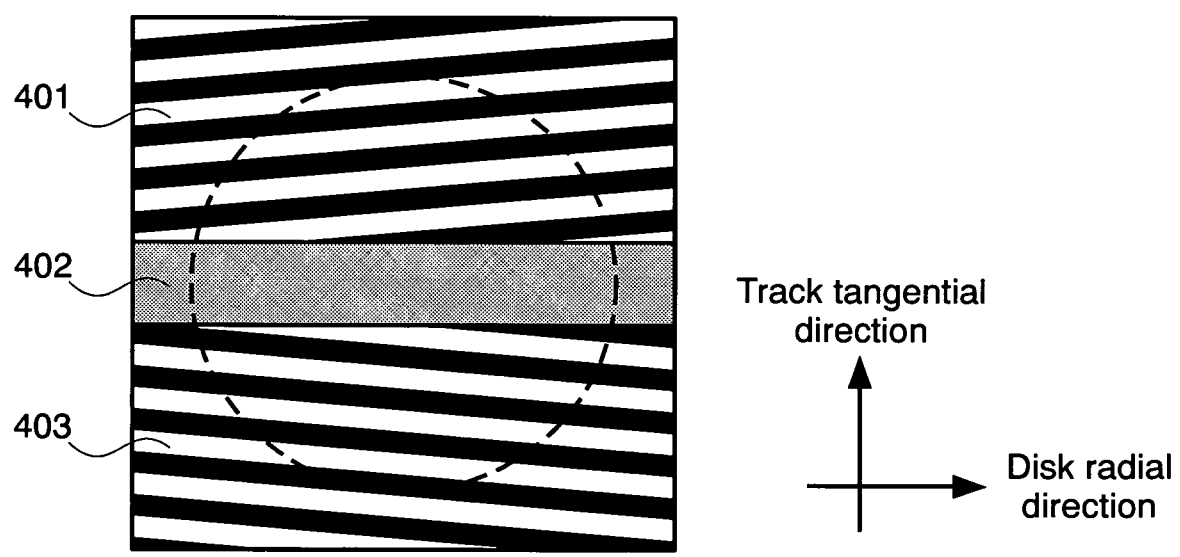
FIG. 14 is a diagram explaining a diffraction grating in the second embodiment.

The second embodiment differs from the first embodiment of this invention shown in FIG. 2 in a diffraction grating 60. FIG. 14 shows the grating 60. The diffraction grating 60 has three divided areas like the first embodiment. Focused positions of the optical beams diffracted by an area 401 on the optical disc 100 and focused positions of the optical beams diffracted by an area 403 on the optical disc 100 are separated by (2n−1)×t/2 in an optical disc radial direction, where n denotes a nonnegative integer and t denotes a spacing of guide grooves of the optical disc. However, regarding an area 402, the optical component is an optical attenuation filter, being different from that of the first embodiment of this invention. In such a case as the first embodiment, the main beam being passed through the diffraction grating changes in shape of the optical beam as compared with before passing through the diffraction grating by a ratio of light diffracted in the area 401 to that diffracted in the area 403. It is expected that, since the ratio of light in the area 401 and light in the area 403 is enlarged, a shape of a optical beam incident on the objective lens differs largely from a shape of an original optical beam; therefore, writing precision may be reduced. In order to suppress this, the quantity of light in the area 402 is decreased by the ratio of light in the area 401 and light in the area 403. This control enables stable writing. Note that, although the optical system on the off center side was shown as in FIG. 13 for the sake of simplification of description, naturally it is allowed to make the center side and the off center side share a common optical path.

Third Embodiment

Figure 15:
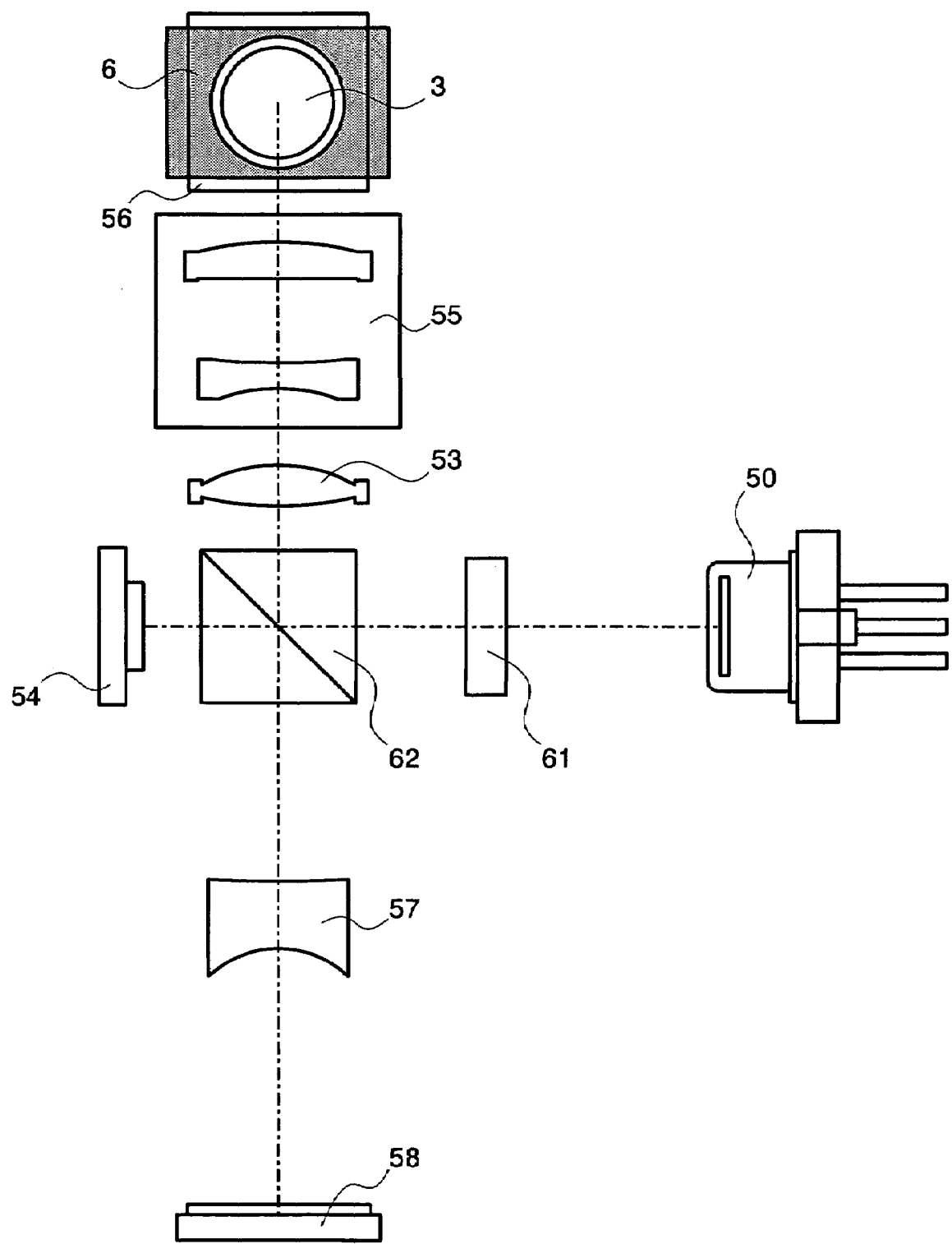
FIG. 15 is a diagram explaining an optical pickup device in a third embodiment.

FIG. 15 shows a schematic diagram of an optical system on the off center side in a third embodiment according to this invention.

A optical beam of a wavelength of substantially 405 nm is emitted from the semiconductor laser 50 as divergent light. The optical beam emitted from the semiconductor laser 50 is divided into six or seven optical beams by a diffraction grating 61 shown in FIG. 16. The five optical beams being passed through the diffraction grating 61 are reflected by a beam splitter 62 and converted into a substantially collimated optical beam by the collimator lens 53. Remaining one or two optical beams are diffracted by the diffraction grating 61, and made incident on the front monitor 54. Generally in the case where information is recorded in an optical disc of a recording type, such as BD-RE, it is necessary to control the quantity of light of a semiconductor laser precisely in order that a predetermined quantity of light is made to irradiate the recording surface of the optical disc. For this reason, when a signal is recorded in the optical disc 100 of a recording type, the front monitor 54 detects a variation in the quantity of light of the semiconductor laser 50, which will be fed back to a drive circuit (not shown in the figure) for the semiconductor laser 50. This procedure makes possible monitoring of the quantity of light on the optical disc 100.

The optical beam emitted from the collimator lens 53 enters the beam expander 55. The beam expander 55 is used to compensate spherical aberration by a thickness error of the cover layer by changing a divergence/convergence state of the optical beam.

The optical beam emitted from the beam expander 55 is reflected by the reflection mirror 56, and focused on the optical disc 100 by the objective lens 3 for BD mounted on the actuator 6. Five spots are formed on the optical disc 100.

The optical beam reflected by the optical disc 100 is made incident on the optical detector 58 through the objective lens 3 for BD, the reflection mirror 56, the beam expander 55, the collimator lens 53, the beam splitter 62, and the detecting lens 57. When the optical beam is passed through the detecting lens 57, the optical beam is given predetermined astigmatism, and is used to detect the focus error signal.

Figure 16:
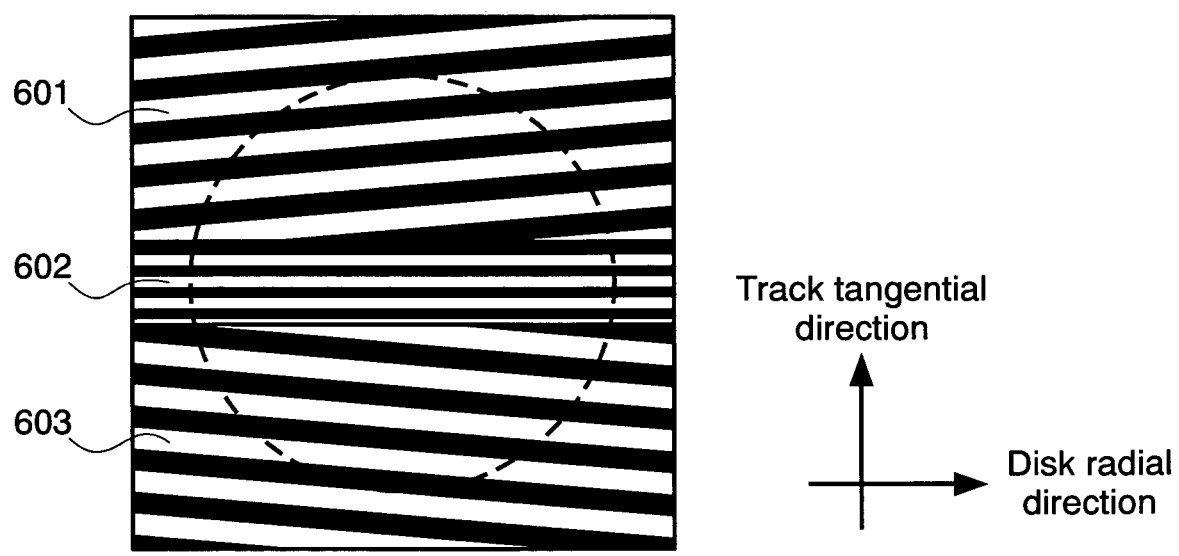
FIG. 16 is a diagram explaining a diffraction grating in the third embodiment.

As shown in FIG. 16, the diffraction grating 61 has three divided areas as in the first embodiment. Designating a non-negative integer by n and designating a spacing of guide grooves of the optical disc 100 by t, a focused position of the optical beam diffracted by an area 601 on the optical disc 100 and a focused position of the optical beam diffracted by an area 603 on the optical disc 100 are separated in an optical disc radial direction by $(2n-1) \times t/2$. However, the second embodiment differs from the first embodiment of this invention in an area 602, which is with a grating structure. The optical beam diffracted by this area 602 is made incident on the front monitor 54 of FIG. 15.

Note that although here the diffracted light from the area 602 is made incident on the front monitor, the diffracted light may be made to irradiate on the optical disc 100 and used to generate servo signals, such as the focus error signal, which will cause no problem.

Fourth Embodiment

Figure 17:
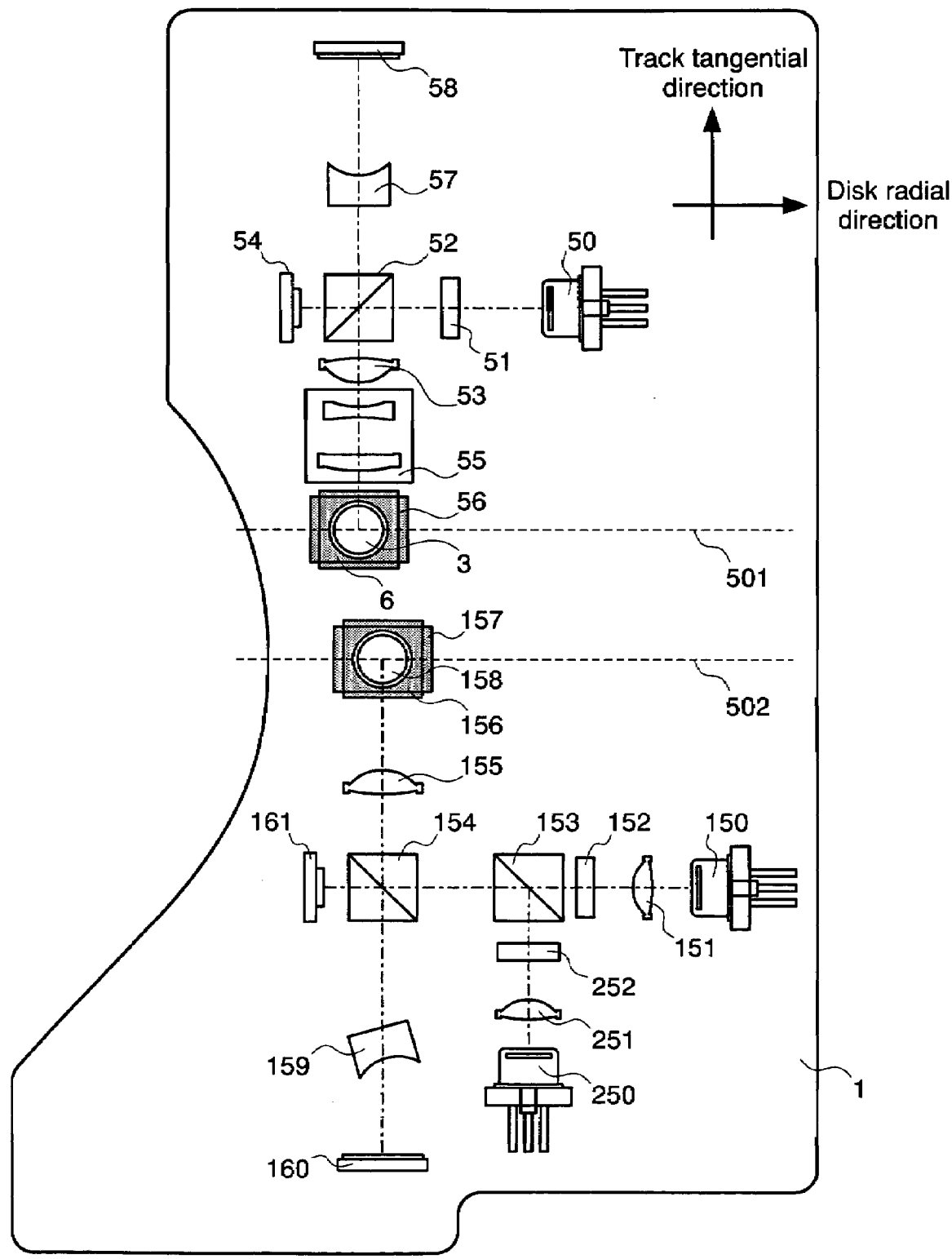
FIG. 17 is a diagram explaining an optical pickup device in a fourth embodiment.

FIG. 17 shows an optical pickup device that is compatible of three kinds of optical discs, i.e., CD, DVD, and BD, in a fourth embodiment according to this invention. Regarding optical components shown in the figure, the same reference numeral is given to the same optical component as that of the first embodiment of this invention shown in FIG. 2. Dot-dash lines in the figure show optical paths in the cases of CD, DVD, and BD. A dotted line 502 is a line that passes through the center of the optical disc and agrees with a seek axis of the optical pickup device 1. As the optical system of BD is the same as that of the first embodiment, optical systems of DVD and of CD will be explained below. The optical system of BD may be the optical system of the second embodiment (FIG. 13) or the third embodiment (FIG. 15), which causes no problem at all.

First, the optical system of DVD will be explained. A optical beam of a wavelength of substantially 660 nm is emitted from a semiconductor laser 150 as divergent light. The optical beam emitted from the semiconductor laser 150 is passed through a correcting lens 151, and enters a diffraction grating 152. The optical beam being passed through the diffraction grating 152 enters a collimator lens 155 through a beam splitter 153 and a beam splitter 154, and is converted in to a collimated optical beam. Part of the optical beam that enters the beam splitter 154 is passed through it, and enters a front monitor 161. The optical beam being passed through the collimator lens 155 is reflected by a reflection mirror 156, and focused on the optical disc by a compatible objective lens 158 for CD and DVD mounted on an actuator 157. Five spots are formed on the optical disc, as in the first embodiment. At this time, the compatible objective lens 158 for CD and DVD is disposed in a position on the dotted line 502 that passes through the center of the optical disc.

The optical beam reflected by the optical disc enters an optical detector 160 through the compatible objective lens 158 for CD and DVD, the reflection mirror 156, the collimator lens 155, the beam splitter 154, and a detecting lens 159. When the optical beam is passed through the detecting lens 159, the optical beam is given predetermined astigmatism, and used for detection of the focus error signal.

Although here the tracking error system explained in the first embodiment was used, the conventional tracking error detection system using three beams may be used, which causes no problem at all.

Next, an optical system of CD will be explained below. A optical beam of a wavelength of substantially 780 nm is emitted from a semiconductor laser 250. The optical beam emitted from the semiconductor laser 250 is passed through a lens 251, and enters a diffraction grating 252. The optical beam being passed through the diffraction grating 252 enters the collimator lens 155 through the beam splitter 153 and the beam splitter 154, and is converted into a collimated optical beam. Part of the optical beam that enters the beam splitter 154 is passed through it, and made incident on the front monitor 161. The optical beam being passed through the collimator lens 155 is reflected by the reflection mirror 156, and focused on the optical disc by the compatible objective lens 158 for CD and DVD mounted on the actuator 157. Five spots are formed on the optical disc, as in the first embodiment. At this time, the compatible objective lens 158 for CD and DVD: is disposed in a position on the dotted line 502 that passes through the center of the optical disc.

The optical beam reflected by the optical disc is made incident on the optical detector 160 through the compatible objective lens 158 for CD and DVD, the reflection mirror 156, the collimator lens 155, the beam splitter 154, and the detecting lens 159. When the optical beam is passed through the detecting lens 159, the optical beam is given predetermined astigmatism, and used for detection of the focus error signal.

Although here the tracking error system explained in the first embodiment was used, the conventional tracking error detection system using three beams may be used, which causes no problem at all.

It is very difficult to manufacture a compatible lens for three wavelengths that can focus optical beams of DVD, CD, and BD whose wavelengths are mutually different on respective predetermined optical discs, respectively, using that one objective lens. Therefore, it has been impossible for an objective lens for DVD, CD, and BD to be disposed on the dotted line 502 leading to the center of the optical disc. Moreover, in the conventional 5-beam DPP method, since the amount of off center cannot be enlarged, it was impossible to mount two lenses on two actuators, respectively, as in FIG. 17. However, by using this invention, a compatible optical pickup for DVD, CD, and BD can be realized and faster recording and reproduction becomes also possible.

Fifth Embodiment

Figure 18:
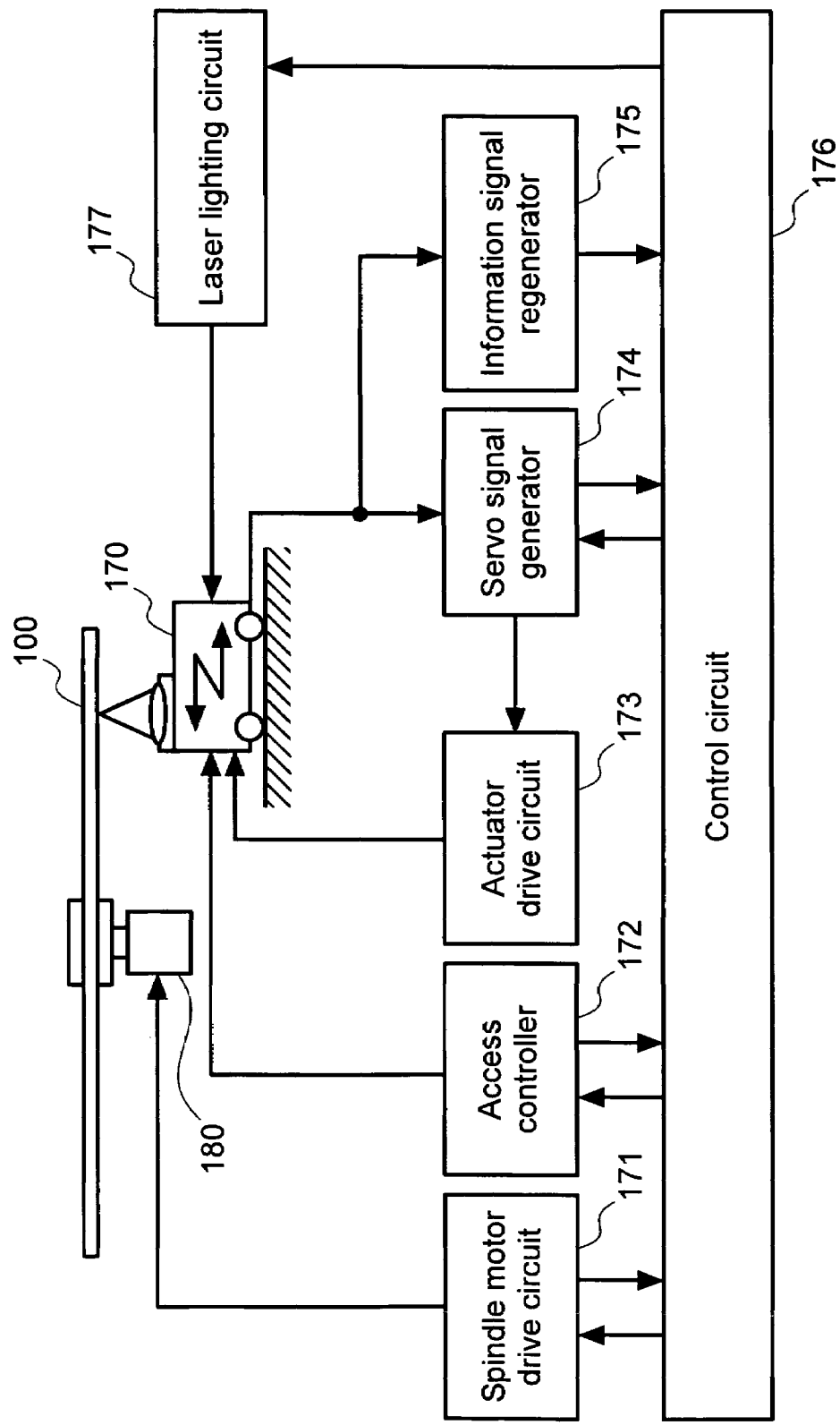
FIG. 18 is a diagram explaining an optical reproduction apparatus in a fifth embodiment.

In a fifth embodiment, an optical reproduction apparatus equipped with an optical pickup device 170 will be explained. FIG. 18 is an outline configuration of the optical reproduction apparatus. The optical pickup device 170 is constructed with a mechanism that enables it to be driven along a radial direction of the optical disc 100, and a position of the optical pickup device is controlled in response to an access control signal from an access controller 172. A laser lighting circuit 177 supplies a predetermined laser driving current to a semiconductor laser in the optical pickup device 170, and the laser emits laser light with a predetermined quantity of light according to reproduction. The laser lighting circuit 177 can be incorporated in the optical pickup device 170.

A signal outputted from the optical detector in the optical pickup device 170 is sent to a servo signal generator 174 and an information signal regenerator 175. The servo signal generator 174 generates servo signals of the focus error signal, the tracking error signal, a tilt control signal, etc. based on the signal from the optical detector, and an actuator drive circuit 173 drives the actuator in the optical pickup device 170 based on them. Thus, a position control of the objective lens is performed.

The information signal regenerator 175 reproduces an information signal currently recorded in the optical disc 100 based on a signal from the optical detector. Apart of the signal obtained by the servo signal generator 174 and the information signal regenerator 175 is sent to a control circuit 176. This control circuit 176 is connected to a spindle motor drive circuit 171, the access controller 172, the servo signal generator 174, the laser lighting circuit 177, etc. and performs a control of rotation of a spindle motor 180 for rotating the optical disc 100, a control of an access direction and an access position, a servo control of the objective lens, a control of the quantity of light of the semiconductor laser in the optical pickup device 170, etc.

Sixth Embodiment

Figure 19:
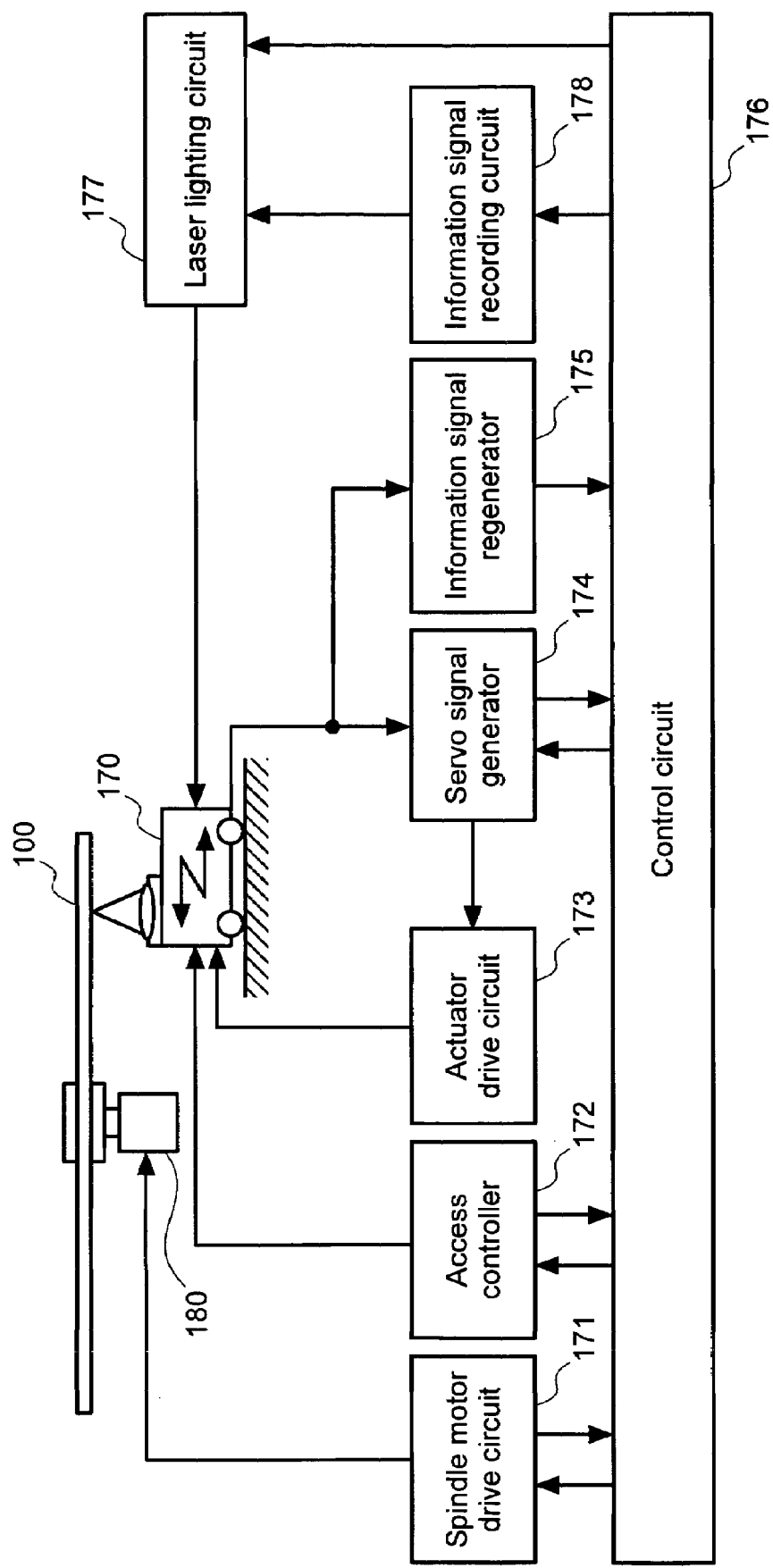
FIG. 19 is a diagram explaining an optical recording and reproduction apparatus in a sixth embodiment.

In a sixth embodiment, an optical recording and reproduction apparatus equipped with the optical pickup 170 will be explained. FIG. 19 is an outline configuration of the optical recording and reproduction apparatus. This apparatus differs from the optical information recording and reproduction apparatus explained with reference to FIG. 18 in that an information signal recording circuit 178 is provided between the control circuit 176 and the laser lighting circuit 177, and thereby the optical recording and reproduction apparatus is added with a function of writing a desired information in the optical disc 100 by controlling lighting of the laser lighting circuit 177 based on a recording control signal from the information signal recording circuit 178.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

What is claimed is:

1. An optical pickup device comprising: a semiconductor laser, a dividing module that divides an optical beam emitted from the semiconductor laser into at least five optical beams, a focusing optical system that focuses the five optical beams into independent five focused spots on a recording surface of an optical disc, and an optical detector that is so disposed as to receive each reflected light of the five focused spots from the optical disc with a light receiving surface divided into two areas or more, wherein the dividing module is a diffraction grating whose area is divided into at least three areas, first, second, and third areas along nearly tangential direction of the optical disc, the first area and the third area sandwiching the second area therebetween, and grating grooves of the first area and of the third area are formed so as to have different angles relative to an optical disc radial direction, wherein grating pitches of the first area are equal to grating pitches of the third area, wherein the five optical beams consist of a zero-order diffracted beam transmitted through the diffraction grating, the first and second beam diffracted by the first area, and the third and fourth beams diffracted by the third area, wherein when the optical beam is shifted off center, the second area is configured so that the first beam is diffracted by the first area does not interfere with the first beam diffracted by the first area and the third beam diffracted by the third area on the optical detector, and a tracking error signal is generated with signals detected on the light receiving surface of the optical detector from the five optical beams in use, in response to the optical beam being shifted off center.

2. The optical pickup device according to claim 1, wherein a dividing direction of the three areas, the first, second, and third areas of the diffraction grating corresponds to a direction along which the objective lens shifts.

3. The optical pickup device according to claim 1, wherein the second area of the diffraction grating that is a dividing means is not of a grating structure.

4. The optical pickup device according to claim 1, wherein the second area of the diffraction grating that is a dividing module is an optical attenuation filter.

5. The optical pickup device according to claim 1, wherein focused positions of optical beams diffracted by the first area and focused positions of the optical beams diffracted by the third area are arranged on the optical disc with a spacing substantially equal to $(2n-1) \times t/2$, respectively, in the optical disc radial direction, where n denotes a nonnegative integer and t denotes a distance between guide grooves of the optical disc.

* * * * *